United States Patent [19]
Krouth et al.

[11] Patent Number: 5,236,202
[45] Date of Patent: Aug. 17, 1993

[54] SPRING LOADED RESIN SEAL

[75] Inventors: Terrance F. Krouth, Eden Prairie; Michael J. Zweber, New Praque, both of Minn.

[73] Assignee: Rosemount Inc., Minneapolis, Minn.

[21] Appl. No.: 763,822

[22] Filed: Sep. 23, 1991

[51] Int. Cl.⁵ .............................................. F16J 15/10
[52] U.S. Cl. .................................... 277/164; 277/170
[58] Field of Search ................ 277/164, 167.5, 170, 277/205, 206 R; 285/111

[56] References Cited

U.S. PATENT DOCUMENTS

| | | | |
|---|---|---|---|
| 3,129,021 | 4/1964 | Willis et al. | 277/205 X |
| 3,223,426 | 12/1965 | Reid | 277/206 R X |
| 3,258,279 | 6/1966 | Johnsen | 277/170 X |
| 3,508,736 | 4/1970 | Rhodes et al. | 277/205 X |
| 3,635,499 | 1/1972 | Reddy | 277/206 R X |
| 3,653,670 | 4/1972 | Sifri et al. | 277/205 X |
| 3,680,874 | 8/1972 | Schwarz | 277/205 X |
| 3,847,819 | 11/1974 | Firth | 277/170 X |
| 3,895,833 | 7/1975 | Thiessen | 285/111 X |
| 4,103,909 | 8/1978 | Hoffman et al. | 277/205 X |
| 4,143,883 | 3/1979 | Paynter | 277/205 X |
| 4,173,129 | 11/1979 | Durham | 277/206 R X |
| 4,228,917 | 10/1980 | Sowell | 277/206 R X |
| 4,239,242 | 12/1980 | Burns | 277/206 R X |
| 4,328,972 | 5/1982 | Albertson et al. | 277/205 X |
| 4,508,356 | 4/1985 | Janian | 277/205 |
| 4,655,462 | 4/1987 | Balsells | 277/205 X |
| 4,809,590 | 3/1989 | Nauman et al. | 277/170 X |
| 4,850,600 | 7/1989 | Kaetscher et al. | 277/170 X |
| 4,907,788 | 3/1990 | Balsells | 277/205 X |
| 4,974,821 | 12/1990 | Balsells | |
| 5,108,078 | 4/1992 | Balsells | 277/164 X |

FOREIGN PATENT DOCUMENTS

| | | | |
|---|---|---|---|
| 957704 | 2/1957 | Fed. Rep. of Germany | 285/111 |
| 1231867 | 10/1960 | France | 277/205 |
| 735801 | 8/1955 | United Kingdom | 277/205 |

Primary Examiner—William A. Cuchlinski, Jr.
Assistant Examiner—Scott W. Cummings
Attorney, Agent, or Firm—Kinney & Lange

[57] ABSTRACT

A spring loaded seal is placed between three continuous groove walls between mating parts adjacent to a pressure transmitter isolator. The seal includes a resin ring with two ring walls conformable to two of the groove walls. A third ring wall has a continuous slot extending into the ring. A coil spring is placed in the slot such that, upon mating of the parts, the third wall presses the coil spring toward the slot. This compresses the coil spring to sealingly force the first and second outer ring walls against the first and second groove walls respectively with a controlled force. The coil spring's compression controls the sealing force to limit undesired distortion of the groove walls.

11 Claims, 2 Drawing Sheets

5,236,202

SPRING LOADED RESIN SEAL

BACKGROUND OF THE INVENTION

This invention relates to spring-loaded rings formed of deformable resin material for compressing between mating parts to provide a fluid seal around isolator diaphragms in pressure transmitters. Spring-loaded resin seals are known, for example, as taught in U.S. Pat. No. 4,508,356 to Janian, hereby incorporated herein by reference.

In pressure transmitters, a continuous sealing groove generally encircles an isolator diaphragm on the transmitter to receive a seal which, in turn, seals to a flange which delivers process fluid to the transmitter as shown in cross-section in FIG. 1. To meet the requirements of chemical, pressure and temperature cycling compatibility, various seal shapes and materials are used.

In some applications, a resin polymer material, polytetrafluoroethylene, is selected for the seal and formed in a generally triangular shape to fit the groove. After compression in the groove, as shown in FIG. 2, a portion of the seal material can extrude out of the groove. In some applications, a backup ring made of less resilient material is placed in the groove along with the seal to prevent extrusion of the ring outside of the groove. In applications where the temperature changes cyclically, the seal material extrudes out at high temperatures and then when the transmitter is returned to a lower temperature, the sealing force originally placed on the seal is reduced. Over time, the seal can develop leaks because of this reduced sealing force, and the flange must be re-tightened, or in some cases, the seal must be replaced. The high sealing force used can deflect the walls of the groove and deflect the adjacent isolator diaphragm leading to errors in the pressure transmitter output which requires recalibration of the output. The high sealing force used can also cause instability of the transmitter output as the force varies with temperature.

Seals formed of a metal shell surrounding a central spring also are used, but the metal shell has limited ability to deform to seal to the groove surfaces, and exerts very large forces on the seal surfaces which deflect the isolator diaphragm enough to undesirably shift the calibration of the pressure transmitter.

Pressure transmitter seals surrounding isolator diaphragms present a special sealing problem because there is a desire for a relatively high initial sealing force to ensure complete sealing after temperature cycling, but a conflicting need to reduce the sealing force to a controlled level to avoid undue deflection of the isolator diaphragm from distortion of the surrounding seal groove. A more robust seal for pressure transmitters is desired which maintains an adequate sealing force over temperature cycling while also presenting a deformable surface to form a seal to the groove walls, without using excess force which would deflect the isolator diaphragm by an unacceptable amount.

SUMMARY OF THE INVENTION

A seal surrounding an isolator in a pressure transmitter is placed between first, second and third continuous groove walls between mating parts. The seal comprises a ring formed of resin material having first and second outer ring walls conformable to the first and second groove walls and having a third ring wall with a continuous slot extending into the ring for receiving a coil spring. The seal further comprises a coil spring positioned in the slot such that, upon mating of the parts, the third wall presses the coil spring toward the slot, compressing the coil spring to sealingly force the first and second outer ring walls against the first and second groove walls respectively with a controlled force. The coil spring's compression controls the sealing force to limit undesired distortion of the groove walls. The controlled sealing force provides a reliable seal under temperature cycling conditions. In a preferred embodiment, the resin ring comprises the polymer polytetrafluoroethylene, which resists attack from many process chemicals used with pressure transmitters.

DETAILED DESCRIPTION OF THE PREFERRED EMBODIMENTS

Figure 1:
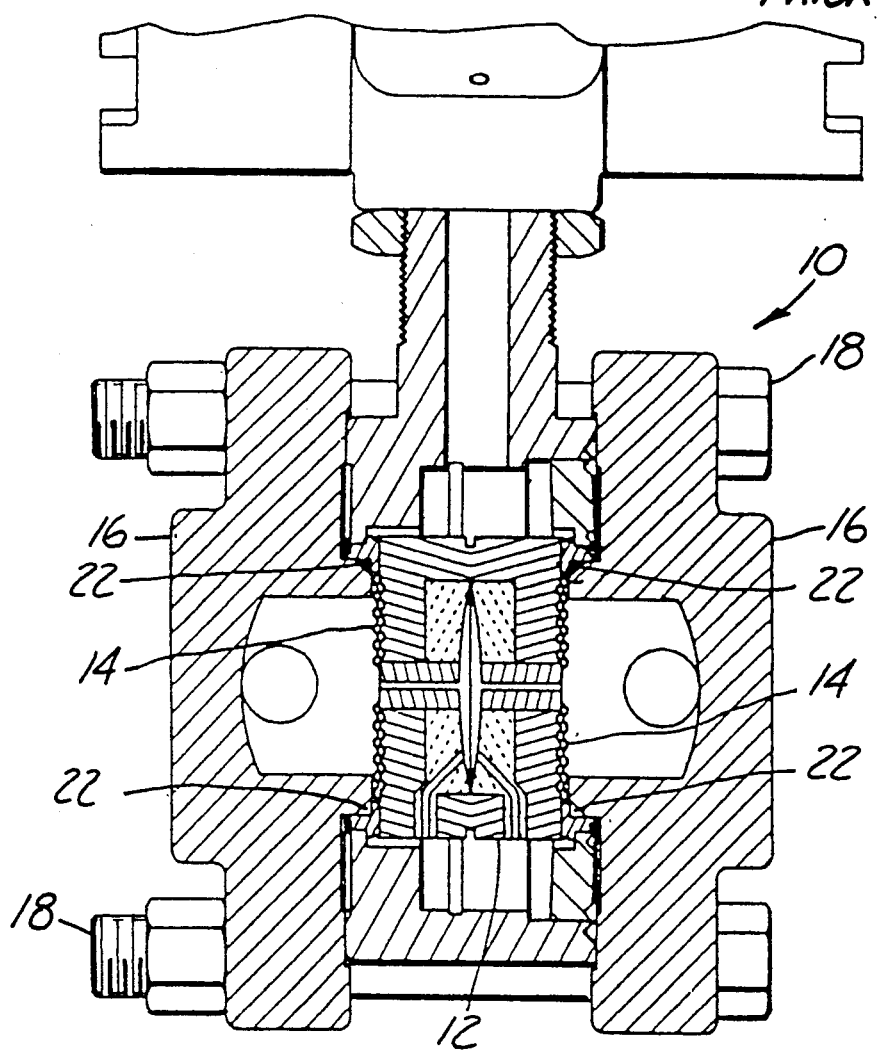
FIG. 1 is a cross-sectional view of a PRIOR ART arrangement of a continuous sealing groove surrounding isolator diaphragms in a pressure transmitter.

In FIG. 1, a PRIOR ART pressure transmitter 10 is shown in cross-section. Pressure sensing cell 12 in pressure transmitter 10 includes isolator diaphragms 14 which isolate pressure sensing cell 12 from process fluids, but are deflectable to transfer pressure inside cell 12 for sensing. Isolator diaphragms 14 are welded around their outer rims to the cell body. When the outer rims of isolator diaphragms 14 are distorted, this deflects the isolator diaphragms and gives a false, undesired indication of a pressure change. Process fluids are coupled to the transmitter by flanges 16 which are attached to transmitter 10 by bolts 18. A continuous, circular sealing cavity 22 is formed between circular rims on cell 12 and beveled edges on flanges 16. Seals 24, which can be O-rings, metal seals, or solid Dupont Teflon ® polytetrafluoroethylene seals are placed in circular sealing cavity 22, and then bolts 18 are tightened to place a sealing force on the seal selected.

Figure 2:
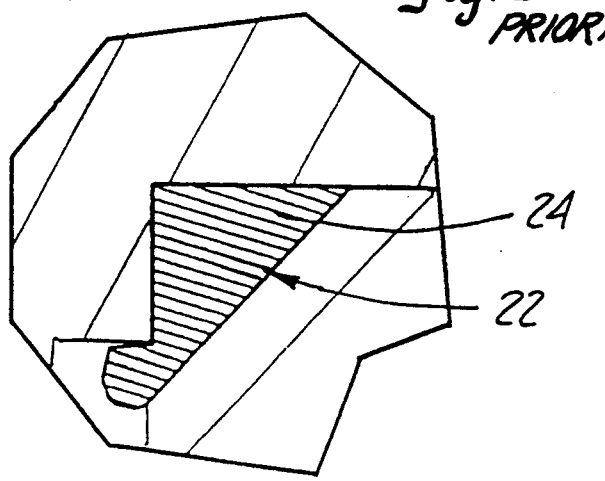
FIG. 2 is a cross-sectional view of a PRIOR ART polytetrafluoroethylene seal after compression in the sealing groove of FIG. 1.

In FIG. 2, a PRIOR ART Teflon seal 24, which is originally triangular in shape, is shown in cross-section in sealing cavity 22 after compression by tightening bolts 18. A portion of the seal has extruded out of cavity 22. A second ring of harder resinous material know as a "backup ring" (not shown) is sometimes placed near the opening of cavity 22 to contain the teflon and reduce problems with the material extruding out of the groove. As stated above, the seal has a limited life in temperature cycling applications and exerts excessive force on the adjacent isolator diaphragm 14 which results in pressure measurement errors.

Figure 3:
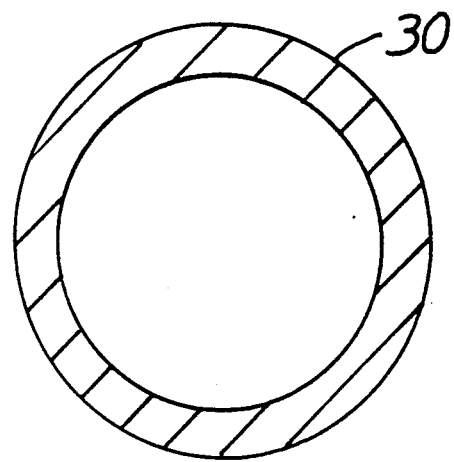
In FIG. 3, a front view of an embodiment of a seal according to the present invention is shown.

In FIG. 3, seal 30 according to the present invention is shown. The seal is continuous and has a shape selected to match the sealing cavity into which it is to be installed, in this case a circular shape.

Figure 4:
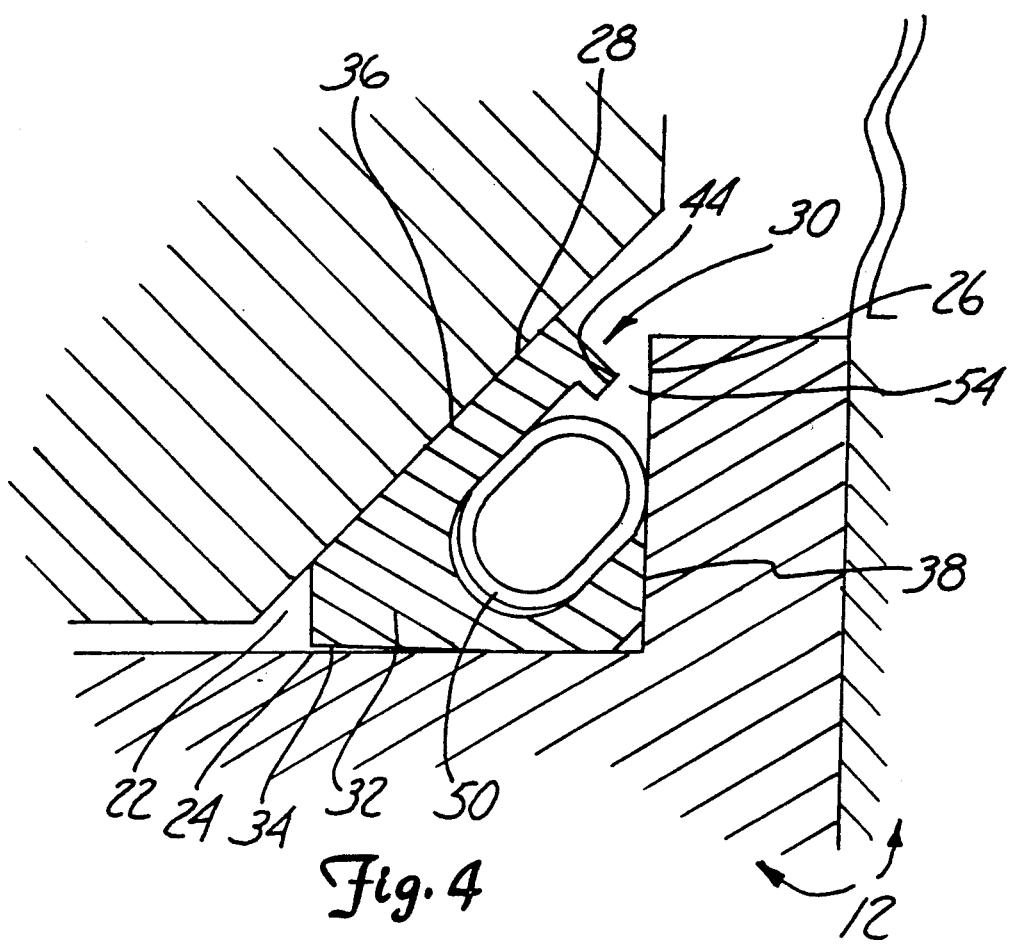
In FIG. 4, a cross-section view of the seal of FIG. 3 disposed in a sealing groove is shown.

In FIG. 4, seal 30 is shown in cross section placed in circular sealing groove or cavity 22. Cavity 22 is defined by groove walls 24, 26, which are part of the pressure sensing cell 12, and by groove wall 28 which is a beveled circular edge of flange 16. The groove walls 24, 26, and 28 are arranged in cross-section in a generally triangular configuration. A seal 30 according to the present invention is placed between the groove walls 24, 26, and 28 between the mating cell 12 and the flange 16. The seal comprises a ring 32 formed of resin material having first and second outer ring walls 34, 36 conformable to the first and second groove walls 24, 28 and having a third ring wall 38 with a continuous slot 42 extending into the ring. The ring 32 is preferably formed of a polymer such as Teflon polytetrafluoroethylene which has resilient characteristics allowing it to confirm to the groove walls 24, 28 to seal when force is applied. The groove walls 24, 28 preferably have a very smooth, highly polished surface to effect a seal with the ring 32 without use of excessive sealing force. The resin ring 32 has a generally triangular shape to fit the cavity 22, but the corners of the ring 32 are truncated to avoid high forces that would otherwise be encountered when these corners are squeezed together as the bolts 18 are tightened.

Continuous slot 42 is shaped to receive a coil spring and has a protrusion 44 near its opening to wall 38 which serves as a retainer for a coil spring.

Coil spring 50 is continuous and is positioned in the slot 42 such that, upon mating of the parts, the third wall presses the coil spring 50 toward the slot 42, compressing the coil spring to sealingly force the first and second outer ring walls against the first and second groove walls respectively with a controlled force, the coil spring's compression controlling the sealing force to limit undesired distortion of the groove walls. The third wall 26 can either press directly on the coil spring 50, or the third wall 26 can press on coil spring 50 indirectly through a portion of ring 32, or the third wall 26 can press on the coil spring by a combination of both direct and indirect pressing as shown in FIG. 4.

An insert of harder material can also be included in the cavity 22 at 54 to limit extrusion of the ring out of the cavity if desired.

The coil spring 50 is preferably a helically wound coil spring which is wound to be slanted to provide improved spring characteristics. The outer shape of the spring winding 50 can be round or oval as shown in FIG. 4.

Although the invention has been described with reference to preferred embodiments, workers skilled in the art will recognize that changes may be made in form and detail without departing from the spirit and scope of the invention.

We claim:

1. A seal for placement between first, second and third continuous groove walls of a continuous groove formed between first and second parts and bounding a space to be sealed, said seal providing sealing between a surface of the second groove wall formed by a wall of the second part, and a surface of the first groove wall formed on the first part, the third groove wall being formed on the first part and being substantially perpendicular to the first groove wall, such that the groove has a substantially triangular cross section, comprising:

a continuous ring formed of a resin material having first and second outer ring walls conformable to the surfaces of the first and second groove walls, and having a third ring wall positioned generally parallel to the third groove wall, said third ring wall having a continuous slot extending into the ring defined by a pair of parallel surfaces which in turn are generally parallel to the surface of the second groove wall, which is oblique of both the first and third groove walls; and a continuous coil spring formed to fit within the slot, and having a portion of its surface engaged by the surface of the third wall, the mating parts being movable toward each other for effecting sealing, and the surface of the second groove wall creating a force on the ring which tends to cause the coil spring to expand in direction outwardly of the slot and against the third wall, the coil spring being compressed to sealingly force the first and second ring walls against the first and second groove walls respectively with a controlled force, the compression of the coil spring controlling the sealing force to limit undesired distortion of the groove walls.

2. A seal for placement between the first, second and third continuous groove walls of a continuous groove formed between first and second parts, the first and third groove walls being formed on the first part, and the second groove wall being formed on the second part, the seal comprising:

a ring formed of resin material having first and second outer ring walls conformable to the first and second groove walls and having a third ring wall with a continuous slot extending into the ring and facing the third groove wall, the continuous slot being a ring slot defined by surfaces oblique to the first and third groove walls; and a coil spring positioned in the slot such that upon mating of the parts, the coil spring is urged toward both the first and third groove walls, the third groove wall presses the coil spring in a direction toward the slot, compressing the coil spring to sealingly force the first and second outer ring walls against the first and second groove walls respectively with a controlled force, the coil spring's compression controlling the sealing force to limit undesired distortion of the groove walls.

3. The seal of claim 2 wherein the ring is formed of a material which comprises a polymer.

4. The seal of claim 3 wherein the polymer comprises polytetrafluoroethylene.

5. The seal of claim 2 wherein the first and the third groove walls are perpendicular to one another.

6. The seal of claim 2 wherein the slot is defined by a pair of slot walls extending inwardly from the third ring wall, the slot walls being substantially parallel to second groove wall.

7. A seal for placement between first, second and third continuous groove walls of a continuous groove formed between first and second parts, the first and third groove walls being formed on the first part, and the second groove wall being formed on the second part, the seal comprising:

a ring formed of resin material having first and second outer ring walls conformable to the first and second groove walls and having a third ring wall with a continuous slot extending into the ring and facing the third groove wall, the continuous slot having a central axis on a locus of lines inclined relative to the first groove wall; and a coil spring positioned in the slot such that upon mating of the parts, the coil spring is urged toward both the first and third groove walls, the third groove wall presses the coil spring in a direction toward the slot, compressing the coil spring to sealingly force the first and second outer ring walls against the first and second groove walls respectively with a controlled force, the coil spring's compression controlling the sealing force to limit undesired distortion of the groove walls.

8. The seal of claim 7 wherein the ring is formed of a material which comprises a polymer.

9. The seal of claim 7 wherein the polymer comprises polytetrafluoroethylene.

10. The seal of claim 7 wherein the first and the third groove walls are perpendicular to one another.

11. The seal of claim 7 wherein the slot is defined by a pair of slot walls extending inwardly from the third ring wall, the slot walls being substantially parallel to second groove wall.

* * * * *

UNITED STATES PATENT AND TRADEMARK OFFICE
CERTIFICATE OF CORRECTION

PATENT NO. : 5,236,202
DATED : August 17, 1993
INVENTOR(S) : Terrance F. Krouth, et. al.

It is certified that error appears in the above-indentified patent and that said Letters Patent is hereby corrected as shown below:

Title page, item [75], Inventors: cancel "New Praque" and insert -- New Prague--.

Col. 3, line 12, cnacel "confirm" and insert --conform--.

Col. 4, line 16, cancel "the".

Signed and Sealed this

Ninth Day of August, 1994

Attest:

BRUCE LEHMAN

Attesting Officer    Commissioner of Patents and Trademarks